United States Patent
Jiang et al.

(10) Patent No.: US 11,370,898 B2
(45) Date of Patent: *Jun. 28, 2022

(54) PHOSPHATE IONIC LIQUID-POLYOXOMETALATE-INORGANIC FLAME RETARDANT ADDITIVE FOR LSZH COMPOUNDS

(71) Applicant: CORNING INCORPORATED, Corning, NY (US)

(72) Inventors: Dayue Jiang, Painted Post, NY (US); Kevin Andrew Vasilakos, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/776,566

(22) Filed: Jan. 30, 2020

(65) Prior Publication Data

US 2020/0165412 A1  May 28, 2020

Related U.S. Application Data

(63) Continuation of application No. PCT/US2018/044335, filed on Jul. 30, 2018.

(60) Provisional application No. 62/440,091, filed on Aug. 2, 2017.

(51) Int. Cl.

| C08K 5/15 | (2006.01) |
|---|---|
| C08K 5/1545 | (2006.01) |
| C08L 23/06 | (2006.01) |
| C08L 23/08 | (2006.01) |
| C08L 23/16 | (2006.01) |
| C08L 33/08 | (2006.01) |
| C08K 5/17 | (2006.01) |
| C08K 5/52 | (2006.01) |

(52) U.S. Cl.
CPC ............ *C08K 5/1545* (2013.01); *C08L 23/06* (2013.01); *C08L 23/0853* (2013.01); *C08L 23/16* (2013.01); *C08L 33/08* (2013.01); *C08K 5/17* (2013.01); *C08K 5/52* (2013.01)

(58) Field of Classification Search
CPC . C08K 5/17; C08K 5/52; C08K 5/066; C08K 9/12; C08K 2003/323; C08K 3/105; C08K 3/11

See application file for complete search history.

(56) References Cited

U.S. PATENT DOCUMENTS

| 6,492,453 B1 | 12/2002 | Ebrahimian et al. |
|---|---|---|
| 8,781,278 B2 | 7/2014 | Karayianni |
| 10,428,209 B2 | 10/2019 | Jiang et al. |
| 2013/0081853 A1 | 4/2013 | Mundra et al. |
| 2015/0268430 A1* | 9/2015 | Bringuier ............... G02B 6/443 385/113 |
| 2015/0353832 A1 | 12/2015 | Xu |
| 2019/0085154 A1 | 3/2019 | Jiang et al. |

FOREIGN PATENT DOCUMENTS

| CN | 103421241 A | 12/2013 | |
|---|---|---|---|
| CN | 103435633 B | 12/2013 | |
| CN | 103435844 A * | 12/2013 | .............. Y02P 20/52 |
| CN | 103435844 A | 12/2013 | |
| WO | 2019027882 A1 | 2/2019 | |

OTHER PUBLICATIONS

Ugal, J.R., et al.; Journal of the Association of Arab Universities for Basic and Applied Sciences, 2010, vol. 9, p. 2-5.*
Chen et al; "Increasing the Efficiency of Intumescent Flame Retardant Polypropylene Catalyzed by Polyoxometalate Based Ionic Liquid"; J. Mater. Chem. A., 1; pp. 15242-15246 (2013).
Chen et al; "Roles of Anion of Polyoxometalate-Based Ionic Liquids in Properties of Intumescent Flame Retardant Polypropylene"; RSC Adv.; 4; pp. 32902-32913 (2014.
Herrmann; "New Synthetic Routes to Polyoxometalate Containing Ionic Liquids: An Investigation of Their Porperties" ; Springer Spektrum; p. 13 (2015.
International Search Report and Written Opinion of the International Searching Authority; PCT/US2018/044335; dated Oct. 17, 2018; 12 Pages; European Patent Office.
Wikipedia; "Polyoxometalate"; 6 Pages; (Last Updated Mar. 21, 2020).
Wang et al; "Roles of Supermolecule Structure of Melamine Phosphomolybdate in Intumescent Flame Retardant Polypropylene Composites" ; Journal of Analytical and Applied Pyrolusis; 119; pp. 139-146 (2016.

* cited by examiner

*Primary Examiner* — Robert S Jones, Jr.
(74) *Attorney, Agent, or Firm* — William D. Doyle

(57) ABSTRACT

A flame retardant polymer composition is provided. The polymer composition includes a polymer resin and a flame retardant package dispersed within the polymer resin. The flame retardant package includes an additive of a polyoxometalate ionic liquid (PIL) and a synergist carrier. In particular, the PIL includes organic cations that produce an acid upon heating. Also, a flame retardant optical fiber cable is provided. The cable includes at least one optical fiber and a polymeric jacket that surrounds the at least one optical fiber. The polymeric jacket includes a polymer resin, a carbon source, an acid source, a polyoxometalate ionic liquid (PIL), and a synergist carrier. In particular, the PIL includes organic cations that produce an acid upon heating.

20 Claims, 1 Drawing Sheet

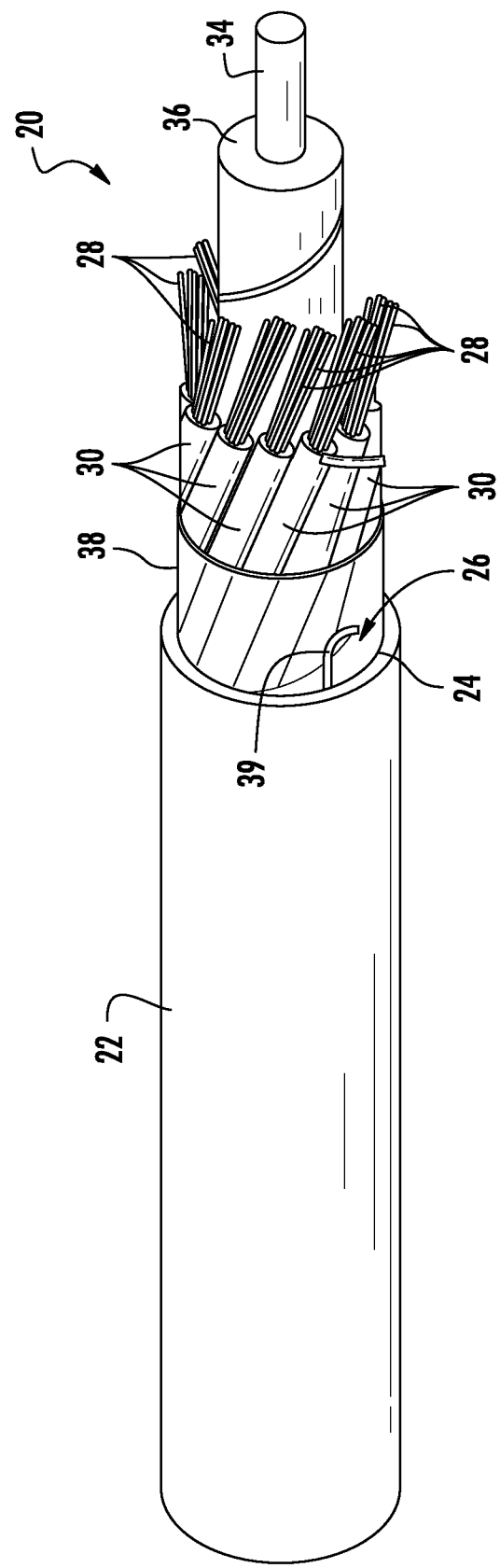

PHOSPHATE IONIC LIQUID-POLYOXOMETALATE-INORGANIC FLAME RETARDANT ADDITIVE FOR LSZH COMPOUNDS

CROSS REFERENCE TO RELATED APPLICATIONS

This application is a continuation of International Application No. PCT/US2018/044335 filed Jul. 30, 2018, which claims the benefit of priority of U.S. Provisional Application Ser. No. 62/540091, filed Aug. 2, 2017, the content of which is relied upon and incorporated herein by reference in its entirety

BACKGROUND

The disclosure relates generally to flame retardant compounds and more particularly to a low smoke, zero halogen compound. Flame retardant materials are used to protect combustible materials, such as plastics or wood, from fire damage and heat. Additionally, flame retardant materials have been used to protect materials, such as steel, that lose their strength when exposed to high temperatures.

SUMMARY

In one aspect, embodiments of a polymer composition are provided. The polymer composition includes a polymer resin and a flame retardant package dispersed within the polymer resin. The flame retardant package includes an additive of a polyoxometalate ionic liquid (PIL) and a synergist carrier. In particular, the PIL includes organic cations that produce an acid upon heating.

In another aspect, embodiments of a cable are provided. The cable includes at least one optical fiber and a polymeric jacket that surrounds the at least one optical fiber. The polymeric jacket includes a polymer resin, a carbon source, an acid source, a polyoxometalate ionic liquid (PIL), and a synergist carrier. In particular, the PIL includes organic cations that produce an acid upon heating.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIG. 1 depicts a cable including one or more components incorporating a polymer compound including the low smoke, zero halogen additive according to an exemplary embodiment.

DETAILED DESCRIPTION

Various embodiments of an additive, such as a low smoke, zero halogen (LSZH) compound suitable for use as, for example, a flame retardant in polymer compounds are provided. The LSZH additive includes a polyoxometalate (POM) that has been modified with an ionic liquid (IL) acid source. The modified POM is referred to herein as a polyoxometalate ionic liquid (PIL). The PIL is then combined with a synergist carrier to form the LSZH additive. The LSZH additive is deployed as part of a flame retardant package. In embodiments, the flame retardant package is an intumescent flame retardant package. The LSZH additive can be included, for instance, in a polymer resin. The resulting LSZH polymer resin can be utilized in such applications as cable jackets for fiber optic cables. However, while fiber optic cables will be discussed as an exemplary embodiment, the LSZH additive can also be utilized in a variety of other contexts and applications.

The LSZH additive is designed to enhance the efficacy of flame retardant compounds, including intumescent flame retardant compounds, and to limit the amount of smoke emitted from a polymer (or other matrix) containing the LSZH additive in the event of a fire. Additionally, the polymer compounds containing the LSZH additive emit very low or no halogens when exposed to high heat sources. Accordingly, a polymer resin containing an LSZH additive will emit little or no toxic and/or corrosive smoke. At least in part, the LSZH additive provides these advantages by utilizing an IL acid source that catalyzes the charring reaction. Further the LSZH additive incorporates a synergist that, e.g., promotes char formation, forms a thermally insulating ceramic layer, and/or releases water during burning. Moreover, because the LSZH additive does not include compounds containing halogens, the aforementioned issues of toxic and/or corrosive smoke are mitigated.

In an embodiment, the LSZH additive is comprised of a PIL and a synergist carrier. A variety of IL acid sources are suitable for use in the LSZH additive. In embodiments, the IL is a phosphorus-based chemical, a boron-based chemical, or a sulfur-based chemical. In particular, the IL is formed from a reaction of ammonium, imidazolium, guanidinium, pyridium, morpholinium, pyridazinium, 1,2,4-triazolium, triazine, sulfonium, phosphazenium, or phosphonium and a phosphorous-based, boron-based, or sulfur-based acid or anion. More specifically, the IL is one or more of: polyphosphoric acid reacted with a base (including, but not limited to, 1,8-diazabicyclo[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7,triazabicyclo[4.4.0]dec-5-ene (MTBD), 1,1,3,3,-tetramethylguanidine (TMG), etc.), polyvinylphosphoric acid and polyvinyl sufonic acid based ionic liquid, sulfonic acid functionalized imidazolium ionic liquid (including, but not limited to, 1-(1-propylsulfonic)-3-methylimidazolium chloride and 1-(1-butylsulfonic)-3-methylimidazolium chorlide), etc. A variety of other ionic liquids suitable for use in the present invention are disclosed in U.S. Publication No. 2011/0073331 (Application Ser. No. 12/947,377, filed on Nov. 16, 2010), the entire contents of which are incorporated herein by reference thereto.

As part of the PIL, the IL acid source decomposes when exposed to an elevated temperature of 200° C. or higher. In other embodiments, the IL acid source decomposes when exposed to an elevated temperature of 250° C. or higher. In particular, the IL acid source will decompose to produce an acid, such as cationic oniums, which catalyzes the charring reaction.

Regarding the POM, the POM makes the charring/carbonization process of the flame retardant package faster and more efficient by catalyzing the charring process. In particular, the POM helps to create a denser char residue, thereby enhancing flame retardance. Exemplary POM for use in the PIL have the structure of three or more transition metal oxyanions linked together by shared oxygen atoms to form a large, closed three-dimensional framework. In embodiments, the metal atoms are generally classified as, but are not limited to, group 5 or group 6 transition metals, such as vanadium(V), niobium(V), tantalum(V), molybdenum(VI), and tungsten(VI). In certain embodiments, the POM is selected for its smoke suppressant properties. In specific smoke suppressant embodiments, the smoke suppressant POM contains molybdenum or zinc atoms.

Further, a variety of specific polyoxometalate anions are suitable for use in forming the PIL of the LSZH additive, including $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, among others. In specific embodiments, the polyoxometalate is selected to contain molybdenum because of molybdenum's superior performance when used as a smoke suppressant as compared to other metal atoms. In exemplary embodiments, the molybdenum-containing POM compound is one or more of molybdenum trioxide, ammonium octamolybdate, molybdenum acetate $[Mo_2(acetate)_4]$, molybdenum dialkyldithiocarbamate, calcium and zinc molybdates, or other organo-molybdenum and/or molybdenum-containing compounds.

The IL acid source and the POM are reacted to form the PIL. In embodiments, the PIL is formed through an acid/base reaction or through an ion-exchange reaction. In a particular embodiment, the IL acid source and the POM are both added to water, and the IL acid source cation will react with the POM anion in an ion exchange reaction. In a non-limiting exemplary embodiment, provided by way of illustration, the IL acid source is polyphosphoric acid (which can be of any length) with an organic base of DBU. The polyphosphoric acid and DBU are added at a ratio of 1:1 in water. The hydroxyl groups of the polyphosphoric acid form oxygen anions, and the hydrogens will bond with a nitrogen of the DBU, forming a DBU cation. The polyphosphate will decompose at an elevated temperature to form an acid source. In an exemplary embodiment, a POM (e.g., ammonium phosphomolybdate) is reacted with the IL acid source in water at an equivalent of 1:1. An ion exchange reaction will then occur between the IL and POM. In an alternative embodiment, instead of the previously described two step PIL synthesis process, all of the ingredients (polyphosphoric acid, DBU, and ammonium phosphomolybdate) are added to water at the same time such that the PIL is formed in a single reaction step.

After obtaining the PIL, the PIL is loaded into, or otherwise mixed with, a synergist carrier to form the LSZH addtive. In an embodiment, the PIL is mixed with the synergist in water at a weight ratio of from 3:1 to 1:5 of PIL to synergist. In a particular embodiment, the weight ratio is from 1:1 to 1:2 of PIL to synergist. The mixture of synergist and PIL (i.e., the LSZH additive) is then dried to remove the water, and the LSZH additive can, for example, be added to a flame retardant package, a polymer resin, or another matrix.

In embodiments, the synergist carrier is an inorganic compound, such as a zeolite, a clay, a bentonite, and/or zinc borate, among others. The use of the term "synergist" denotes that the synergist carrier operates with the PIL to enhance flame retardance and/or smoke suppression of the flame retardant package. The synergist carrier can do so in a variety of ways, including, for example, forming a ceramic layer in or on the char layer/foam, releasing water when decomposed to dilute the combustible gases and/or to suppress smoke, thermally insulating the polymer compound, functioning as an anti-dripping agent, and/or, together with the PIL, promoting the function (e.g., the catalytic effect) on the charring process of the flame retardant package. In embodiments, the LSZH additive comprises between 0.1 to 5% of the total weight of the composition into which the LSZH additive is deployed.

In a particular embodiment, the synergist is zeolite 4A. Zeolite 4A has a pore diameter of 4Å and a bulk density of 0.60-0.65 g/mL. Additionally, zeolite 4A can absorb 20-21%, by weight, of water and exhibits an attrition of 0.3-0.6%, by weight. The zeolite 4A enhances the performance of the flame retardant and/or intumescent compound.

As mentioned, in embodiments, the LSZH additive is deployed as part of a flame retardant package. In embodiments, the flame retardant package also includes an acid source and a carbon source. In such embodiments, the acid source is (like the IL acid source) a phosphorous-, boron-, or sulfur-containing chemical. In a more specific embodiment, the acid is a phosphorous-containing chemical, such as ammonium polyphosphate (APP). Further, in embodiments, the carbon source is a polyol, such as pentaerythritol (PER) and/or its derivatives. In other embodiments, the carbon source can include phenol formaldehyde resins, polyamides, sorbitol, starches, and cyclodextrins, among others. The acid source, under heating, decomposes and forms an acid that catalyzes the carbon source to carbonize and solidify through cross-linking reactions, forming a non-combustible char layer. In embodiments, the ratio of the acid source to the carbon source can vary, such as 1:1, 2:1, etc. In an embodiment in which the acid source is APP and the carbon source is PER, an examplary ratio of APP:PER is 2:1 or higher.

In still further embodiments, the flame retardant package includes a spumific compound, such as melamine and its derivatives. The spumific compound forms gases when heated, and the gases cause the solidified carbon (i.e., the char layer created in the carbonization reaction of the acid and carbon source) to expand, forming a char foam. The char foam has a much greater volume than the char layer, which helps insulate the remaining polymer compound from fire and heat. A flame retardant package containing a spumific compound is referred to as intumescent flame retardant package.

The flame retardant package can also include other additives, such as antioxidants, thermal stabilizers, metal hydrates, metal hydroxides (e.g., aluminum trihydroxide and/or magnesium dihydroxide), gas-forming species or combinations of species (e.g., melamine and its derivatives, etc.), char strength boosters, and/or other performance enhancing materials. In certain embodiments, the acid source, carbon source, and/or spumific compound are combined into a single compound.

In embodiments, the flame retardant package (including the LSZH additive and any other additives) comprises between 5% and 60% of the total weight of the compound into which the flame retardant package is deployed. In other embodiments, the flame retardant package comprises between 15% and 40% of the total weight of the compound into which the flame retardant package is deployed. In a more specific embodiment, the flame retardant package comprises between 20% and 35% of the total weight of the compound into which the flame retardant package is dispersed. Use of terms such as deployed or dispersed are not to be construed as requiring that the flame retardant package, for example, be a completely homogenous mixture. Rather, the terms dispersed or deployed as used herein are indicative of any mixture of elements.

As discussed above, the LSZH additive has particular suitability for incorporation into a variety of polymer resins, including both thermoplastic and thermosetting polymers. In embodiments, the polymer resin is a thermoplastic, and in a more specific embodiment, the thermoplastic is a polyolefin-based resin. Polymer resins that may be used with the LSZH additive include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, and maleic anhydride-grafted versions of the polymers listed herein.

The polymer resin may also include non-flame retardant additives such as mineral fillers (talc, calcium carbonate, etc.), antioxidants, UV additives, processing modifiers, compatibilizers, or other standard polymer additives.

A variety of different processes can be used to incorporate the flame retardant package, including the LSZH additive and any other additives, into the polymer resin. Generally, the incorporation processes utilize elevated temperatures, such as between about 140° C. and 220° C. or higher, and sufficient shear, such as at shear rates between 10 $s^{-1}$ and 10,000 $s^{-1}$, to distribute the flame retardant package in the polymer resin. Exemplary equipment for incorporating the flame retardant package into the polymer resin includes a co-rotating twin screw extruder, single screw extruder with mixing zones, a Banbury-style rotary mixer, Buss kneader, and/or other high-shear mixers.

EXAMPLE

In an exemplary embodiment, a PIL for use in the LSZH additive was prepared from polyphosphoric acid, DBU, and ammonium phosphomolybadate by an ion-exchange reaction in water with the equivalent at 1:1:1. The PIL was then mixed with zeolite 4A in water at a weight ratio of 1:2 of PIL to zeolite 4A to form the LSZH additive, which was dried to remove the water. The remainder of the flame retardant package included APP as the acid source and PER as the carbon source at a weight ratio of 2:1 of APP to PER. The flame retardant package, including the LSZH additive, was compounded with a polypropylene homopolymer using a twin screw extruder (34 mm Twin Screw Extruder, available from Leistritz Extrusionstechnik GmbH). The flame retardant package comprised 30%, by weight, of the polymer compound with the LSZH additive accounting for 1% of that weight and the APP/PER accounting for the remaining 29% (the additive and the APP/PER were mixed prior to compounding). Table 1 displays the compounding conditions of the twin screw extruder.

TABLE 1

| Compounding Conditions | |
|---|---|
| Screw Speed (RPM) | 100 |
| Single Feeder (kg/hr) | 2.25 |
| Twin Screw Feeder (g/min) | 9.4 |
| Zone 1 (° C.) | n/a |

TABLE 1-continued

| Compounding Conditions | |
|---|---|
| Zone 2 (° C.) | 150 |
| Zone 3 (° C.) | 180 |
| Zone 4 (° C.) | 180 |
| Zone 5 (° C.) | 160 |
| Zone 6 (° C.) | 160 |
| Zone 7 (° C.) | 160 |
| Zone 8 (° C.) | 160 |
| Zone 9 (° C.) | 160 |
| Zone 10 (° C.) | 160 |
| Die Temp (° C.) | 150 |
| Torque (amps) | 9.1 |
| Vacuum (in/hg) | 5 |

The resulting materials were then injection molded (using an Allrounder 370C injection molding machine, available from Arburg GmbH & Co. KG) into test samples with a processing condition as shown in Table 2.

TABLE 2

| Injection Molding Conditions | |
|---|---|
| Gate Temp (° C.) | 170 |
| Mold Temp Moving Half (° F.) | 100 |
| Mold Temp Fixed Half (° F.) | 100 |
| Temp Zone 1 (° C.) | 170 |
| Temp Zone 2 (° C.) | 180 |
| Temp Zone 3 (° C.) | 190 |
| Temp Zone 4 (° C.) | 200 |
| Temp Zone 5 (° C.) | 200 |
| Dosage Volume (ccm) | 20.5 |
| Holding Pressure Bar Base 1 (Bar) | 900 |
| Holding Time (s) | 3 |
| Step 1: Injection Flow (ccm/s) | 60 |
| Actual Bar Pressure (Bar) | 900 |
| Switch Over Point | 1.65 |

The polypropylene samples were tested to determine their limiting oxygen index (LOI) in accordance with standard ISO 4589 and their UL-94 rating on a vertical burning test. The LOI of a polymer indicates the minimum concentration of oxygen that will support combustion of that polymer. Thus, for flame retardant materials, a higher LOI indicates a higher flame retardance. The UL-94 vertical burning test determines how long a suspended polymer specimen will burn when the polymer specimen is exposed to flame from below. The best rating under UL-94 is V-0 and corresponds to a material that does not exhibit inter alia a burning flame for more than 10 seconds after being lit from the flame source below the sample. Additionally, a polymer with a V-0 rating will not experience dripping flames from the sample. The results of the testing are displayed in Table 3. ("NR" as used in Table 3 means that the sample was not rated).

TABLE 3

| Flame Retardant Properties of Polypropylene Samples | | | | | |
|---|---|---|---|---|---|
| Samples | PP (wt %) | APP/PER (wt %) | PhosIL-POM/ zeolite 4A (wt %) | LOI (%) | UL-94 | Dripping |
| PP | 100 | 0 | 0 | 18.0 | NR | Yes |
| PP control | 70 | 30 | 0 | 27.3 | NR | Yes |
| PP-LSZH | 70 | 29 | 1 | 34.9 | V-0 | No |

Table 3 demonstrates that the addition of the LSZH additive improved the flame retardance of the polypropylene polymer. PP-LSZH possesses a fire performance of V-0

(non-dripping) in the UL-94 test and an LOI of 34.9%. By comparison, the PP control sample, which included 1% higher amount of the flame retardant package and no LSZH additive, exhibited an LOI of 27.3% and a UL-94 rating of "not rated" and exhibited dripping flames.

Because the LSZH provides better flame retardance as evidenced by the results summarized in Table 3, the LSZH additive could allow for reduced loading of a given polymer resin while maintaining the same flame retardant performance, which can provide a material cost savings. Alternatively, the LSZH can allow for increased flame retardant performance at the same loading, which may allow for improved burn performance ratings than previously achieved.

The flame retardant polymer composition, including the LSZH additive, as described herein can be used for a variety of applications. In a particular embodiment as shown in FIG. 1, the flame retardant polymer composition, including the LSZH additive, is used as a jacket for a cable or other fiber optic cable components. Various fiber optic cable components include or, in some embodiments, are made from polymer compounds that are based on polyolefin and olefin copolymers. Without modification, these polyolefin and olefin copolymers are combustible. Accordingly, incorporating the LSZH additive to the polymers that make up fiber optic cable components is expected to reduce combustibility.

By way of example of how and where the LSZH additive can be incorporated, FIG. 1 depicts a fiber optic cable 20, including the LSZH additive. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the flame retardant package, including the LSZH additive, is incorporated into the polymer material of cable jacket 22 of fiber optic cable 20. In another embodiment, the flame retardant package, including the LSZH additive, is incorporated into the polymer material of buffer tubes 30 surrounding the bundles of optical fibers 28. In a further embodiment, the flame retardant package, including the LSZH additive, is incorporated into the water barrier 38. By surrounding the cable and cable components with the flame retardant package, including the LSZH additive, the ability of fire to spread along cable 20 is reduced, and the amount of smoke produced by cable 20 during fire exposure is also reduced.

It is believed that the flame retardant package, including the LSZH additive, discussed above will meet certain flame retardant standards when incorporated in an electrical or tele-communication cable, such as cone calorimeter reaction-to-fire test ISO 5660; single cable test IEC 60332-1-2; vertical multi cable test DIN 50399/IEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A polymer composition, comprising:
a polymer resin; and
a flame retardant package dispersed within the polymer resin, wherein the flame retardant package includes an additive, the additive comprising:
a polyoxometalate ionic liquid (PIL), wherein the PIL includes organic cations that produce an acid upon heating; and
a synergist carrier.

2. The polymer composition of claim 1, wherein the PIL is formed from an ionic liquid produced from a reaction between at least one of ammonium, imidazolium, guanidinium, pyridium, morpholinium, pyridazinium, 1,2,4-triazolium, triazine, sulfonium, phosphazenium, or phosphonium and a phosphorous-based, boron-based, or sulfur-based acid or anion.

3. The polymer composition of claim 1, wherein the PIL is formed from at least one polyoxometalate anion of $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, or $[Nb_6O_{19}]^{8-}$.

4. The polymer composition of claim 1, wherein the synergist carrier includes one or more of a zeolite, a bentonite, a clay, or a zinc borate.

5. The polymer composition of claim 1, wherein the synergist carrier is zeolite 4A.

6. The polymer composition of claim 1, comprising from 0.5 to 5%, by weight, of the additive.

7. The polymer composition of claim 1, comprising from 5% to 60%, by weight, of the flame retardant package.

8. The polymer composition of claim 1, wherein the flame retardant package further comprises an acid source and a carbon source.

9. The polymer composition of claim 8, wherein the carbon source is at least one of a polyol, a polyol derivative, a phenol formaldehyde resin, a polyamide, a starch, or a cyclodextrin.

10. The polymer composition of claim 8, wherein the acid source includes ammonium polyphosphate.

11. The polymer composition of claim 10, wherein the carbon source includes pentaerythritol and wherein the weight ratio of acid source to carbon source is at least 2:1.

12. The polymer composition of claim 8, wherein flame retardant package further comprises a spumific compound.

13. The polymer composition of claim 12, wherein the spumific compound includes melamine.

14. The polymer composition of claim 1, wherein the polymer resin includes one or more of ethylene-vinyl acetate copolymers, ethylene-acrylate copolymers, ethylene homopolymers, linear low density polyethylene, very low density polyethylene, polyolefin elastomer copolymer, propylene homopolymer, polyethylene-polypropylene copolymer, butene- and octene branched copolymers, or maleic anhydride-grafted versions of the polymers listed herein.

15. A cable, comprising:
   at least one optical fiber;
   a polymeric jacket that surrounds the at least one optical fiber;
   wherein the polymeric jacket comprises:
      a polymer resin;
      a carbon source;
      an acid source;
      a polyoxometalate ionic liquid (PIL); and
      a synergist carrier;
      wherein the PIL includes organic cations that produce an acid upon heating.

16. The cable of claim 15, wherein the cable achieves a rating of V-0 according to the UL-94 vertical burn test.

17. The cable of claim 15, wherein the synergist carrier is zeolite 4A.

18. The cable of claim 15, wherein the organic cation is derived from at least one of 1,8-diazabicyclo[5.4.0]undec-7-ene, 1,5-diazabicyclo[4.3.0]non-5-ene, 1,5,7-triazabicyclo[4.4.0]dec-5-ene, 7-methyl-1,5,7, triazabicyclo[4.4.0]dec-5-ene, or 1,1,3,3,-tetramethylguanidine.

19. The cable of claim 15, wherein the PIL is formed from at least one polyoxometalate anion of $[PM_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{11}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, or $[Nb_6O_{19}]^{8-}$.

20. The cable of claim 15, wherein the acid source includes ammonium polyphosphate and the carbon source includes pentaerythritol and wherein the weight ratio of the acid source to the carbon source is at least 2:1.

* * * * *

UNITED STATES PATENT AND TRADEMARK OFFICE
CERTIFICATE OF CORRECTION

PATENT NO. : 11,370,898 B2
APPLICATION NO. : 16/776566
DATED : June 28, 2022
INVENTOR(S) : Dayue Jiang et al.

It is certified that error appears in the above-identified patent and that said Letters Patent is hereby corrected as shown below:

On the Title Page

In item (60), in Column 1, in "Related U.S. Patent Documents", Line 3, delete "62/440,091," and insert -- 62/540,091, --.

In item (56), in Column 2, under "Other Publications", Line 8, delete "(2014." and insert -- (2014). --.

In item (56), in Column 2, under "Other Publications", Line 10, delete "Porperties"" and insert -- Properties" --.

In item (56), in Column 2, under "Other Publications", Line 11, delete "(2015." and insert -- (2015). --.

In item (56), in Column 2, under "Other Publications", Line 19, delete "Pyrolusis;" and insert -- Pyrolysis; --.

In item (56), in Column 2, under "Other Publications", Line 11, delete "(2016." and insert -- (2016). --.

In the Specification

In Column 1, Line 13, delete "entirety" and insert -- entirety. --.

Signed and Sealed this
Thirtieth Day of August, 2022

Katherine Kelly Vidal
*Director of the United States Patent and Trademark Office*